United States Patent [19]

Hake

[11] 4,318,444
[45] Mar. 9, 1982

[54] TELESCOPING HINGE MEMBER ON REARWARDLY FOLDING TOOL BAR

[75] Inventor: Kenneth Hake, Tipton, Kans.

[73] Assignee: Kent Manufacturing Co., Inc., Tipton, Kans.

[21] Appl. No.: 146,191

[22] Filed: May 2, 1980

[51] Int. Cl.$^3$ ............................................. A01B 73/00
[52] U.S. Cl. ................................. 172/456; 172/311; 172/501; 403/109
[58] Field of Search ............... 172/311, 446, 456, 501, 172/584, 586, 662, 776; 56/228, 385; 280/411 R, 411 A, 411 B, 411 C, 412, 413, 639, 656; 403/80, 109, 112, 113, 377; 74/522

[56] References Cited

U.S. PATENT DOCUMENTS

| | | | |
|---|---|---|---|
| 1,843,961 | 2/1932 | Stone | 403/109 X |
| 2,124,842 | 7/1938 | Zierold et al. | 403/109 X |
| 3,774,693 | 11/1973 | Orthman | 172/311 |
| 3,941,194 | 3/1976 | Orthman | 172/311 |
| 3,967,684 | 7/1976 | Haverdink | 172/311 |
| 4,023,623 | 5/1977 | Anderson | 172/311 |
| 4,030,551 | 6/1977 | Boetto et al. | 172/456 X |
| 4,031,965 | 6/1977 | Blair | 172/311 |
| 4,034,623 | 7/1977 | Boone et al. | 74/522 |
| 4,042,044 | 8/1977 | Honnold | 172/311 |
| 4,058,172 | 11/1977 | Blair et al. | 172/311 |
| 4,098,347 | 7/1978 | Honnold | 172/311 |
| 4,126,187 | 11/1978 | Schreiner et al. | 172/311 |
| 4,151,886 | 5/1979 | Boetto et al. | 172/311 |
| 4,171,726 | 10/1979 | Ward | 172/456 |

*Primary Examiner*—Richard T. Stouffer
*Attorney, Agent, or Firm*—Fishburn, Gold and Litman

[57] ABSTRACT

An agricultural implement is disclosed which includes a center section and a plurality of wing sections foldable with respect to each other. A plurality of ground-working tools extend downwardly and rearwardly from the sections of the implement at spaced intervals along the lengths thereof. The wing sections are pivotally connected to the center section by a telescoping hinge which prevents the ground-working tools of the respective sections from conflicting with each other when the implement is folded. The telescoping hinge includes a telescoping member, slidably connected to an end of a first associated section and pivotally connected to an end of a second associated section adjacent to the first associated section. A link member limits the distance in spaced relationship between respective points on the first and second sections and biases the telescoping member to simultaneously slide along the first associated section and pivot with respect to the second associated section when the implement is folded thus producing a telescoping action which maintains a spaced relationship between and prevents entanglement of the ground-working tools of the two sections as they are folded.

19 Claims, 6 Drawing Figures

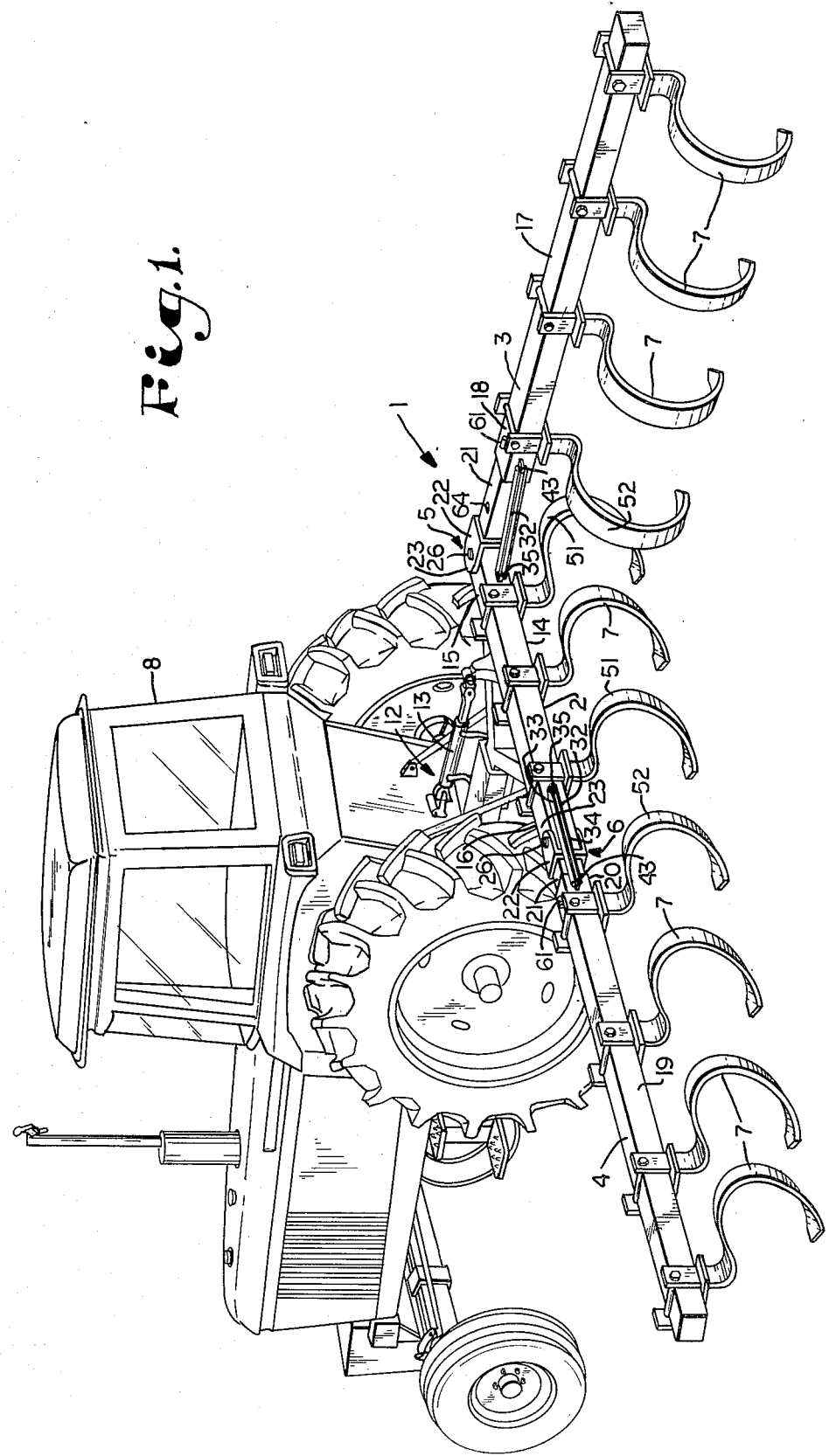

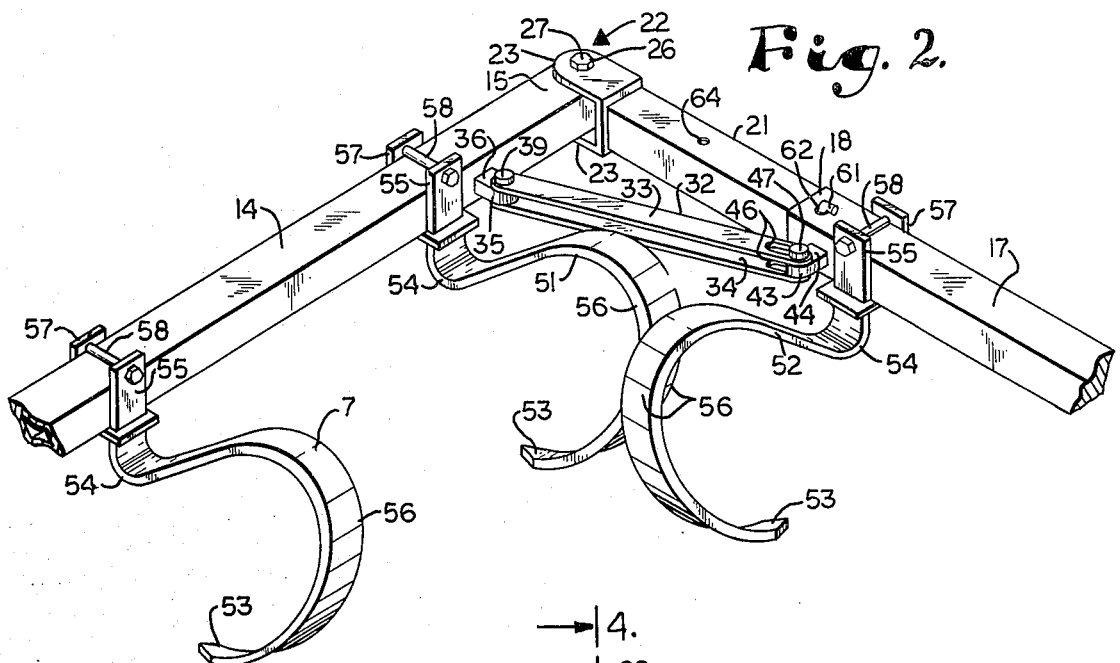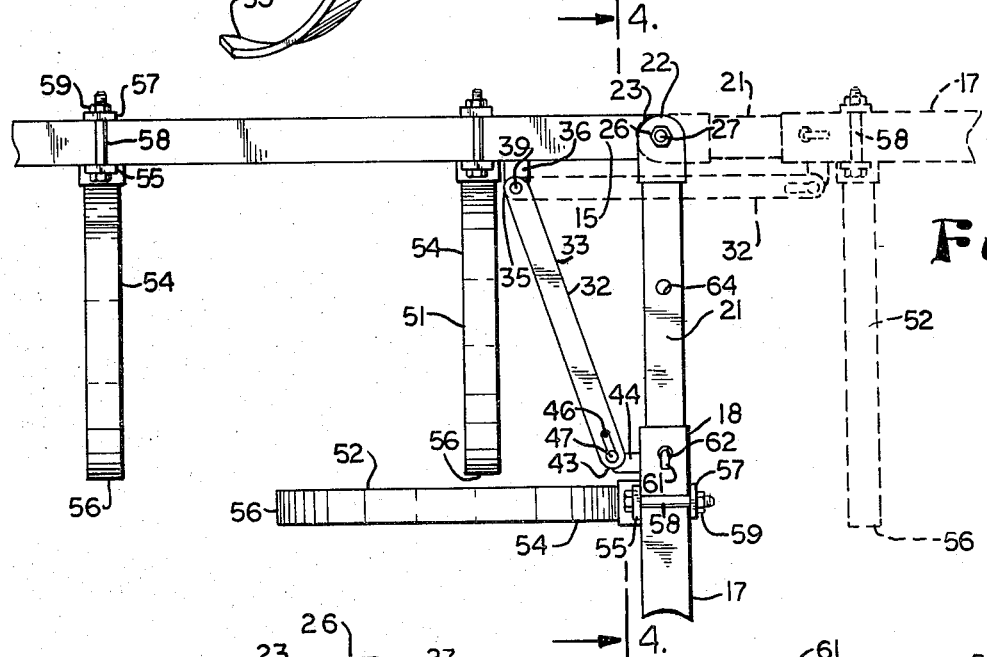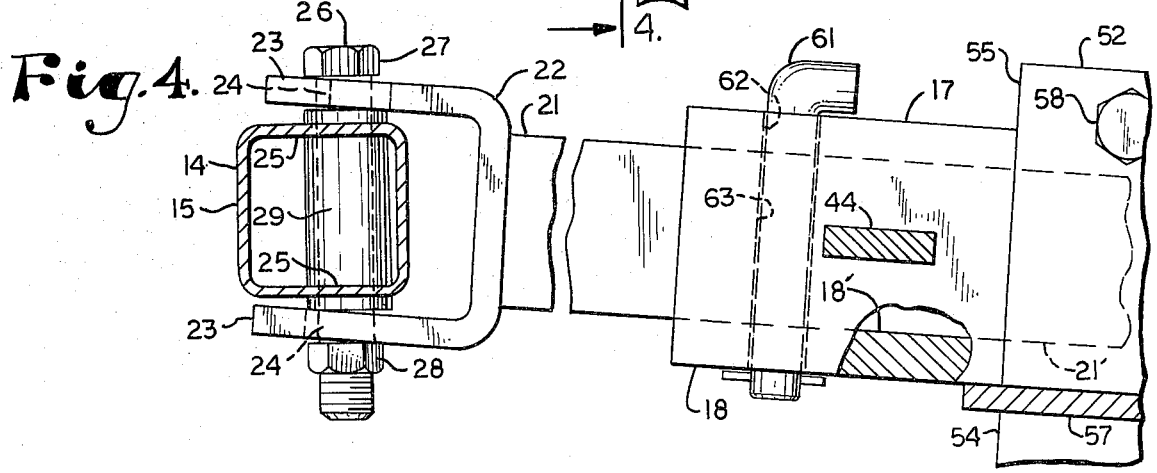

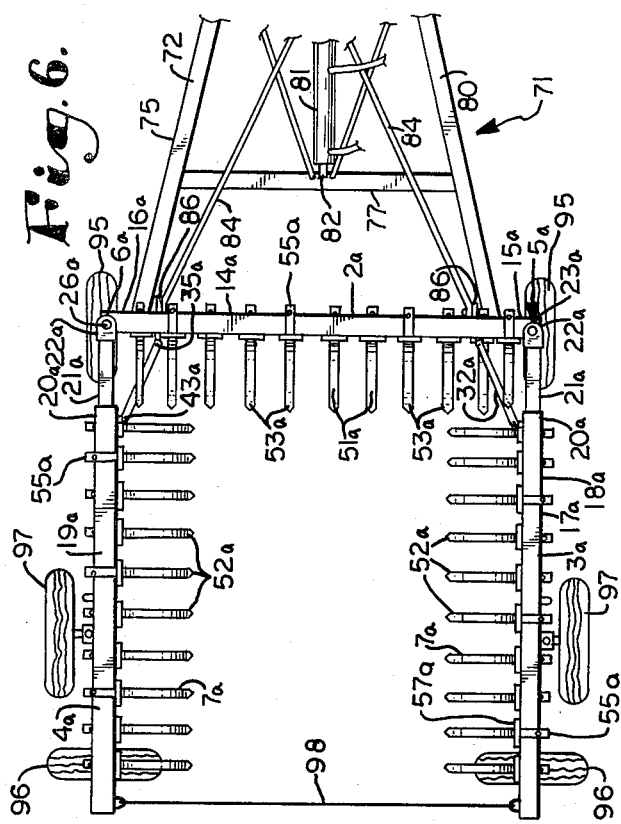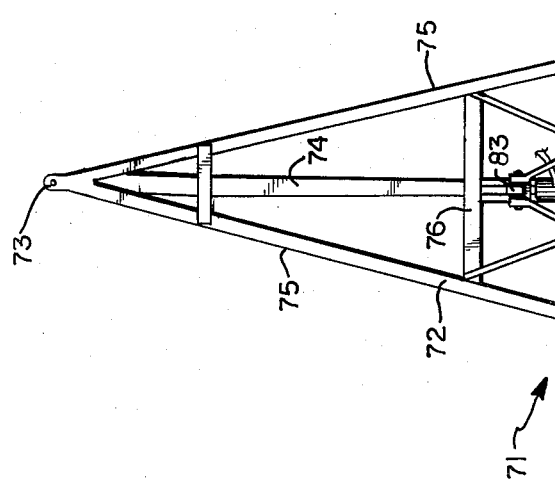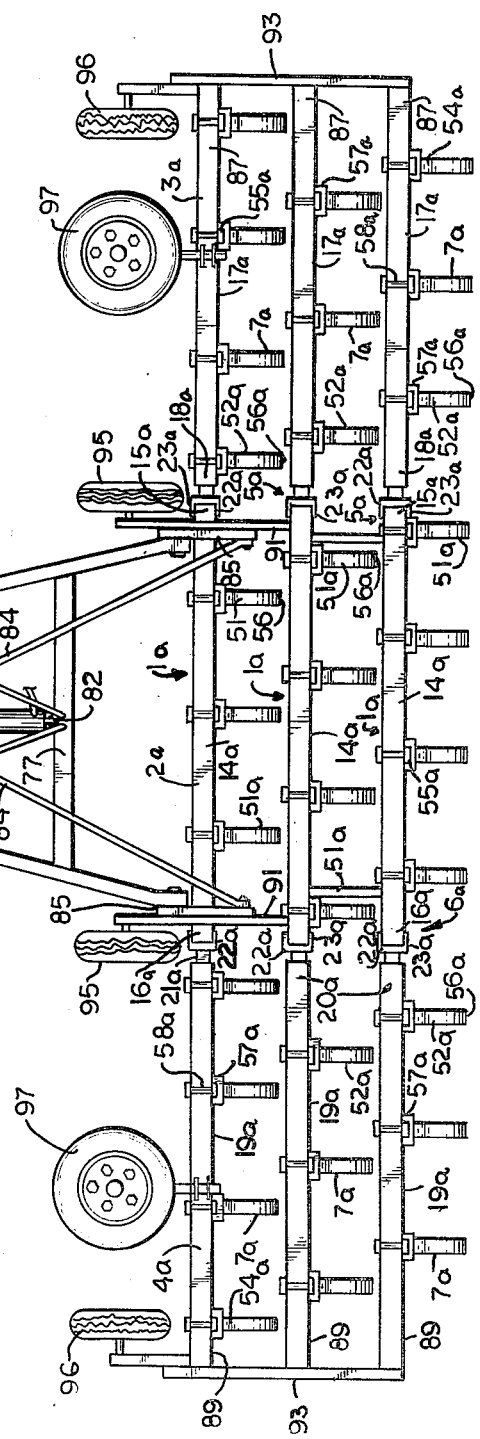

TELESCOPING HINGE MEMBER ON REARWARDLY FOLDING TOOL BAR

BACKGROUND OF THE INVENTION

This invention relates to farm implements of the general type wherein multi-sectional tool bars with ground-working tools thereon may be folded rearwardly from an operating configuration to a transporting configuration. More specifically, a telescoping hinge is disclosed which prevents evenly spaced ground-working tools along said sections from conflicting with each other as the tool bar is folded for transporting or storage. Therefore, ground-working tools which are of the same length and evenly spaced to facilitate cultivation of the earth can be utilized without being a hinderance to folding of the implement from an operating configuration to a transporting configuration.

In recent years, earthworking implements having extended spans of up to seventy-five feet or greater have been developed to permit the working of increasingly larger swaths of a field during each pass thereover. The resulting reduction in time and cost of a cultivating operation tends to improve farm productivity. This development of new and wider earthworking implements and new arrangements of tools thereon has been due at least in part to the development of larger and more powerful farm tractors with their greater pulling capacity.

While wider implements are desirable for efficient field use, they must be capable of being folded to a transporting and storage configuration whereby the implement becomes narrow enough for passage through gates and fences and for negotiation of roadways over which it is pulled by a tractor. Therefore, such implements are typically constructed with wing frames which may be folded upwardly, forwardly or rearwardly for transportation or storage. Although implements with wing sections that fold above the center section have proven somewhat successful for three-section implements, folding mechanisms for implements with a greater number of sections or particularly long wing sections are relatively expensive to build and maintain. Implements where the wing sections are pivoted forwardly to positions alongside the tractor also have their drawbacks. For example, the effective width of the tractor is thereby increased by the depth of the implement sections plus the depth of the ground-working tools extending therefrom with the resulting width often being too great for effective transportation and storage. Partly for these reasons, rearwardly folding implements have gained wide acceptance and are well-known in the field of agricultural implements. A problem addressed by many conventional versions of rearwardly folding implements, as well as the present invention, is that of entanglement of the ground-working tools which typically project rearwardly when the implement is folded.

A solution to this problem is disclosed in U.S. Pat. No. 4,058,172 issued to Blair and myself which provides for the distal ends of one set of tools being located forwardly of the distal ends of another set of tools which allows them to intermesh without entanglement when the implement is folded. A different arrangement is illustrated in the Honnold U.S. Pat. No. 4,098,347 which includes wing sections shifted by a hydraulic ram from a retracted position within a center section to an extended position where the implement may be folded rearwardly. However, as can be seen in FIG. 1 of the aforementioned patent, power means must be provided to shift the wing sections with respect to the center section. Also, the wing sections can fold rearwardly only when translated as far as possible outwardly from the center section.

There has not heretofore been available an agricultural implement which may be rearwardly folded without entanglement of evenly spaced groundworking tools extending therefrom in the manner and with the efficiency of the present invention.

SUMMARY OF THE INVENTION

The principal objects of the present invention are: to provide a telescoping hinge for foldable agricultural tool bars which allows such tool bars to be folded; to provide such a hinge on an implement having at least one wing section which folds rearwardly with respect to a center section whereby lateral spacing of the tools can be at regular intervals and the implement folded without entanglement of the tools when the wing section is folded relative to the center section; to provide an agricultural implement with ground-working tools of substantially equal length and deflection for consistent tillage of a field; to provide a hinge mechanism which allows groundworking tools on a wing section when folded to overlap tools on a center section; to provide such a hinge mechanism adaptable for use with a single folding tool bar or with a foldable implement frame having multiple tool bars; to provide such a hinge mechanism for folding implements having a center section and multiple wing sections on either side thereof; to provide a foldable implement adapted for following the contours of a field and for maintaining consistent contact therewith; to provide such a hinge mechanism adapted for use on new or existing foldable agricultural implements; to provide such a hinge mechanism which allows implements to be easily and quickly folded and unfolded; to provide an implement which may be drawn by a tractor and folded and unfolded by same; to provide such a hinge mechanism between adjacent sections of an implement such that ground-working tools are automatically maintained in spaced relation when the implement is folded; to provide such a hinge mechanism for foldable agricultural implements wherein telescopic action is utilized to shift and space sections as the implement is folded; and to provide such a hinge mechanism and implement which is economical to manufacture, efficient in use, capable of a long operating life and particularly well adapted for the proposed use.

Other objects and advantages of this invention will become apparent from the following description taken in conjunction with the accompanying drawings wherein are set forth by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of a tractor mounted agricultural implement which includes an agricultural tool bar having a center section along with a folded and an unfolded wing section; each wing section being connected to the center section by a telescoping hinge mechanism according to the present invention.

FIG. 2 is a fragmentary enlarged perspective view of the implement showing one of the telescoping hinge mechanisms connecting the center section and one of the wings such that the wing section is folded.

FIG. 3 is a fragmentary enlarged top plan view of the implement showing one of the telescoping hinge mechanisms in a folded position wherein the center section and one of the wing sections are folded as shown in FIG. 2 and showing the hinge in an operating position in phantom lines.

FIG. 4 is a fragmentary vertical cross-sectional view of one of the hinge mechanisms taken along line 4—4 of FIG. 3.

FIG. 5 is a top plan view of a modified implement including multiple sections interconnected by a hinge mechanism according to the present invention, each section having multiple tool bars shown in an extended operating configuration.

FIG. 6 is a partial top plan view of the modified implement of FIG. 5 showing wing sections folded upwardly and rearwardly into a transporting configuration and showing the spaced relationship of ground-working tools thereon.

DESCRIPTION OF THE PREFERRED AND ALTERNATIVE EMBODIMENTS

As required detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

For purposes of description herein, the terms "upper", "lower", "right", "left", "vertical", "horizontal", and derivatives thereof along with other standard directional terms shall relate to the invention as oriented in FIG. 1 for the first embodiment and FIG. 5 for the second embodiment. The term "rear" for the first and second embodiments is understood to mean toward the bottom of the pages as seen in FIG. 3 and FIG. 5 respectively and the term "front" has the opposite meaning. However, it is to be understood that the invention may assume various alternative orientations except where expressly specified to the contrary.

In the first illustrated embodiment of the present invention as shown in FIGS. 1, 2, 3 and 4, the reference numeral 1 generally designates a foldable agricultural implement or tool bar comprised of a center section 2 pivotally connected to a right wing section 3 by a right telescoping hinge 5 and to a left wing section 4 by a left telescoping hinge 6. A plurality of ground-working tools 7 are evenly spaced along the tool bar 1 and project downwardly and rearwardly therefrom. The ground-working tools 7 are spaced such that adjacent tools 7 would engage one another if one portion of the tool bar 1 were simply pivoted 90° relative to another portion thereof. The tool bar 1 is connected to and pulled by a tractor 8 having a conventional hydraulic system such as a three point hitch or the like which enables an operator thereof to activate a hydraulic cylinder 13 that trails behind the tractor 8 and is pivotally connected to the tool bar 1, as shown in FIG. 1. The three point hitch 12 in conjunction with the hydraulic cylinder 13 pivotally connects the tractor 8 and the center section 2 for raising and lowering the tool bar 1 from a ground engaging position to a non-ground engaging position.

The center section 2 is comprised of an elongated transversely aligned tube 14 having a cross-sectional shape which is substantially square and having a right end 15 and a left end 16. The right and left wing sections 3 and 4, respectively, are comprised of tubes 17 and 19 which are shown having cross-sectional shapes which are substantially annularly square and have adjacent or proximate ends 18 and 20 associated with and adjacent center section ends 15 and 16 respectively. Elongated passageways 18' as shown in phantom in FIG. 4 and associated with right wing section 3 and left wing section 4 are substantially square in cross-sectional shape and are defined by the interior of the respective proximate ends 18 and 20.

Telescoping members 21 include slide portions 21' as shown in FIG. 4 with substantially square cross-sectional shapes suitable for mating with the elongated passageways such as 18' and which are slidably positioned therein so as to slide in and out of the proximate ends 18 and 20 of the right and left tubes 17 and 19 respectively. The telescoping members 21 include clevis or trunnion-like end portions 22 with side plates 23 which are spaced from the slide portions 21' and which extend outwardly from the elongated passageways 18'. The right and left ends 15 and 16 of the center tube 14 are spaced to fit and slide between the side plates 23 so as to allow pivoting thereof with respect to the telescoping members 21, as is best seen in FIG. 3. Because the axes about which the tubes 17 and 19 pivot with respect to the telescoping members 21 are spaced outwardly from the elongated passageways 18' at all times, the respective wing sections 3 and 4 are each pivotal with respect to and simultaneously separable a variable distance from the center section 2 when the telescoping members 21 slide within the elongated passageways 18. A pivot pin member 26 consists of a bolt 27 with a nut 28 attached to one end thereof and a sleeve 29 over the bolt 27. The pin member 26 extends through aligned apertures 24 on the side plates 23 and apertures 25 on opposite sides of the center tube 14 as shown in FIG. 4. The sleeve 29 is positioned within the apertures 25 of the center tube 14 and retained in place by the side plates 23, the apertures 24 therein being sized to receive the bolt 27 but smaller than the sleeve 29.

The side plate apertures 24 are elongated from left to right as seen in FIG. 4 to allow for limited movement of the bolt 27 therein. FIG. 4 shows the telescoping member 21 in a slight angular configuration with respect to the center tube 14. While FIG. 4 shows the wing section 3 folded with respect to the center section 2, it should be noted that the elongated apertures 24 allow the telescoping member 21 to assume a slight angular configuration with respect to the center tube 14 when the respective wing sections 3 and 4 are extended to an operating configuration wherein they are substantially aligned as is the left wing section 4 in FIG. 1. Therefore as the tool bar 1 is drawn over an uneven field surface, the respective wing sections 3 and 4 can independently respond to variances in ground elevation and maintain the ground-working tools 7 in consistent contact therewith. Another object of the use of the elongated apertures 24 is that when the tool bar 1 is folded to a transporting configuration, as is the right wing section 3 in FIG. 1, a certain amount of vertical play in such a rearwardly extending wing section is desirable to alleviate excessive stress in the respective hinges 5 and 6, particularly if the tractor 8 is to be driven over an irregular surface which would tend to bounce such a rearwardly extending wing section.

A rigid link member 32 is pivotally connected at one end thereof to each of the right and left ends 15 and 16 of the center tube 14 and at the opposite end thereof to the proximate ends 18 and 20 of the right and left tubes 17 and 19 respectively. Each link member 32 is adapted for automatically biasing the telescoping members 21 to slide and pivot with respect to the sections 2, 3 and 4 as they are folded and unfolded relative to each other. The rigid link members 32 also serve to retain the telescoping members 21 in the elongated passageways such as 18' by limiting the distance in spaced relationship between respective points on wing sections 3 or 4 and center section 2 when the tool bar 1 is folded to its transporting configuration and the telescoping members 21 are at their maximum extension. In the illustrated embodiment of FIGS. 1 through 4, each of the rigid link members 32 is comprised of upper and lower elongated sections 33 and 34 respectively and is attached at one end by a link hinge connector 35 on the center tube 14 and at an opposite end thereof by a lost motion link hinge connector 43 to the respective proximate ends 18 and 20 of the right and left tubes 17 and 19. The center tube pivotal connectors 35 are comprised of lugs or ears 36 protruding rearwardly from the respective right and left ends 15 and 16 of the center tube 14 and having apertures (not shown) therethrough. Apertures (also not shown) on the associated end of the upper and lower sections 33 and 34 are aligned with the apertures on the ears 36 and have pivot means or pin 39 positioned therein which allows the rigid link member 32 to pivot with respect to the center tube 14. The pin 39 is retained in the apertures by suitable mechanism such as enlarged heads, cotter pins, or the like. The opposite ends of each of the rigid link members 32 are pivotally connected to the tube proximate ends 18 and 20 by a lost motion mechanism or coupling which comprises elongated apertures 46 in the link members 33 and 34 as shown in FIG. 2. The elongated apertures 46 for each link member 32 are aligned with an associated aperture (not shown) on one of the ears 44 attached to the proximate ends 18 and 20 and are adapted for receiving pivot means or pin 47 therein which allow the upper and lower sections 33 and 34 to pivot with respect to the tube 17 or 19 associated therewith. The pin 47 is retained in the apertures associated therewith by a suitable mechanism such as enlarged heads, cotter pins, or the like.

The lost motion link hinge connectors 43 on the right and left tubes 17 and 19 serve similar purposes to the lost motion linkage provided by the elongated apertures 24 on the ends 22 of the telescoping members 21 and work in conjunction with that lost motion linkage to allow for a limited amount of angular movement between the center section 2 and the wing sections 3 and 4, such that excessive wear of the right and left telescoping hinges 5 and 6 is prevented and the sections 2, 3 and 4 are allowed to respond independently to an irregular ground surface and maintain the ground-working tools 7 in substantial contact therewith.

For purposes of uniform and consistent field tillage, it is generally considered advantageous for the ground-working tools 7 to be of substantially the same length and configuration and to be evenly spaced along the agricultural tool bar 1. It is also considered advantageous for the ground-working tools 7 to be made of the same metal and to have substantially the same width and thickness whereby rearward deflection of the individual tools 7 is the same when subjected to the same torqueing or resistance conditions in working a field. This then results in more uniform tillage of the soil and clearance of trash from the field without excessive build up of trash on the tools 7.

As best shown in FIG. 2 of the present embodiment, each of the ground-working tools 7 has a distal end 53 acutely angled with respect to the horizontal, a convoluted connector section 54 depending from a vertical tool bar engaging end 55, and an arcuate working section 56 extending from the convoluted connector section 54 to the distal end 53. The convoluted connector section 54 and the arcuate working section 56 achieve a desired flexing action of the ground-working tools 7 during operation of the tool bar 1. As illustrated in FIG. 3, the arcuate working sections 56 of the ground-working tools 7 project rearwardly from the center section 2 and from the wing sections 3 and 4 when the implement is in its operating configuration as the left wing section is shown in FIG. 1. The ground-working tools 7 are thereby allowed to flex rearwardly in response to varying amounts of torqueing force to which the tools 7 are subjected during operation on a field surface. The ground-working tools 7 are attached to the agricultural tool bar 1 by removably securing the tool bar engaging ends 55 thereof against a side of the tubes 14, 17 and 19 by means of brackets 57 with apertures (not shown) aligned with apertures (also not shown) in the tool bar engaging ends 55. Suitable means such as bolts 58 with associated nuts 59 for retaining and tightening the tool bar engaging ends 55 and the brackets 57 on the tubes 14, 17 and 19 are positioned in the aligned apertures associated therewith. The convoluted connector sections 54 are thereby maintained out of contact with the respective tubes 14, 17 and 19, hence leaving the tools 7 unhindered to flex when so urged.

Ground-working tools 7 attached to the center section 2 at the right end 15 and left end 16 thereof are designated by the reference numeral 51. The right and left wing sections 3 and 4 have ground-working tools designated by the reference numeral 52 attached to the proximate ends 18 and 20 respectively thereof. The ground-working tools 51 and 52 are of substantially similar length and configuration as the other tools generally designated by the numeral 7 and project rearwardly substantially the same distance when the tool bar 1 is in an operating configuration. When the tool bar 1 is folded to a transporting configuration, as seen in FIG. 2, the telescoping members 21 are at their maximum extension from the elongated passageways defined by the proximate ends 18 and 20 of the right and left tubes 17 and 19. In addition, when in the transporting configuration, the ground-working tools 52 adjacent or near the proximate ends 18 and 20 are approximately perpendicular to and are in spaced relationship rearward of the ground-working tools 51 respectively positioned near the right and left ends 15 and 16 of the center tube 14. Entanglement and damage to the respective tools 51 and 52 during folding of one of the wing sections 2 or 4 with respect to center section 2 or while the tool bar 1 is in the transporting configuration wherein the wing sections 3 and 4 are generally perpendicular to the center section 2 is thereby avoided.

It should be noted that the spacing between the ground-working tools 7, the distance which the arcuate working sections 56 project rearwardly and the cross-sectional width of the tools 7 are all factors in determining the amount of clearance needed by tools 51 and 52 to avoid entanglement therebetween. The distance which each of the telescoping members 21 slides from its fully inserted to its fully extended position within the respective elongated passageway will vary with the placement of the link hinge connectors 35 and 43 of the rigid link member 32 on the associated ends 15 and 16 of the center tube 14 and on the proximate ends 18 and 20 of the right and left tubes 17 and 19, and with the length of the rigid link member 32.

The tool bar 1 is adjustable such that by increasing the length of each rigid link member 32 and thereby the distance between the link hinge connectors 35 and 43 the distance which the telescoping member 21 slides relative to an associated wing section 3 or 4 when the tool bar 1 is folded is increased, which in turn allows ground-working tools 7 which have arcuate working sections 56 extending further rearwardly to be utilized without entanglement thereof. Also, alternative tool constructions and arrangements may be utilized successfully with the present invention. For example, shanks which are somewhat less resilient than the illustrated ground-working tools 7 may be provided to serve as mounts for pointed shovels, hoes and the like and ground-working tools of different lengths and resiliencies which extend rearwardly from the agricultural tool bar 1 may be utilized and entanglement therebetween will be avoided by the telescoping action of the invention as described herein. However, equal spacing and uniform downward extension are preferred for maintaining equal rearward deflection and thereby uniform tillage as previously described.

In operation, the agricultural tool bar 1 is transported in a folded position as the right wing section 3 is with respect to the center section 2 as shown in FIG. 1, the hydraulic cylinder 13 having been activated to raise the agricultural tool bar 1 by pivoting same on the three point hitch 12 thereby preventing the ground-working tools 7 from engaging the ground or a road surface. The right and left wing sections 3 and 4 are retained in a folded transporting configuration and are prevented from swinging with respect to the center section 2 by locking pins 61 positioned in apertures 62 near the proximate ends 18 and 20 of the right and left tubes 17 and 19 respectively and telescoping member first apertures 63 aligned therewith and passing through the telescoping members 21 as shown in FIG. 4. However, it should be noted that a limited amount of movement between the wing sections 3 and 4 and the center section 2 is considered desirable even in a locked transporting configuration and is allowed by the aforedescribed elongated apertures 24 and the lost motion link hinge connectors 43.

The tool bar 1 may then be unfolded to an operating configuration as the left wing section 4 is shown with respect to the center section 3 in FIG. 1 by withdrawing each of the locking pins 61 from the associated apertures 62 and the telescoping member first apertures 63 and swinging or folding the wing sections 3 and 4 forwardly about the axis of the pivot pin 26 to a longitudinally aligned position with respect to the center section 2. Folding of the wing sections 2 and 4 may be accomplished by means of the operator or by movement of the tractor 8. The locking pins 61 are then positioned through the apertures 62 and through telescoping member second apertures 64 which thereby maintain the agricultural tool bar 1 in an operating configuration and prevent the folding of the same. The hydraulic cylinder 13 is then activated to lower the tool bar 1 and allow the acute angled distal ends 53 of the ground-working tools 7 to contact a field surface.

In operation over an irregular field surface, the respective right and left wing sections 3 and 4 are allowed to float or pivot vertically a limited amount with respect to the center section 2 and thereby maintain the ground-working tools 7 in substantially uniform contact with the field surface.

To fold the agricultural tool bar 1, the hydraulic cylinder 13 is first activated to raise the ground-working tools 7 above the ground surface. The locking pins 61 are then removed from the apertures 62 and 64 and the wing sections 3 and 4 may be swung rearwardly at the distal ends thereof about the pivot pins 26 by the operator or by movement of the tractor 8 in a forward direction. The rigid link members 32 will automatically urge or bias the associated telescoping members 21 to slide outwardly to a maximum extension thereof relative to associated elongated passageways such as 18'. The ground-working tools 52 then overlap or mesh without engagement and are in spaced relationship rearward of the tools 51 such that entanglement and damage therebetween is thereby avoided. The locking pins 61 are repositioned to prevent excessive swinging of the wing sections 3 and 4 and the implement 1 may be transported or stored, having assumed its narrowest configuration. It is foreseen that other various locking devices such as control wire or the like could be utilized to hold the wing sections 3 and 4 in operative and transporting positions.

A modified embodiment comprising a rearwardly folding agricultural implement having multiple tool bars connected by telescoping hinge members, is generally designated by the reference numeral 71, and is illustrated in FIGS. 5 and 6. Parts shown in the implement 71 of the present invention which are substantially similar to parts appearing in FIGS. 1 through 4 disclosing the tool bar 1 of the first embodiment are represented by the same corresponding reference numeral except for the addition of the suffix "a" to the numerals of the second embodiment.

The folding agricultural implement 71 comprises a plurality of agricultural tool bars 1a each of which includes a center section 2a pivotally connected to a right wing section 3a by a right telescoping hinge 5a and to left wing section 4a by a left telescoping hinge 6a. A plurality of ground-working tools 7a are evenly spaced along the tool bars 1a and project downwardly and rearwardly therefrom when the implement 71 is in an operating configuration as shown in FIG. 5. The implement 71 of the present invention is pulled by a tractor (not shown) and is attached thereto by a yoke assembly 72. The yoke assembly 72 is comprised of a tongue 74 with a towing hitch 73 at the end thereof. Two side members 75 are attached to the tongue 74 toward the front end thereof and diverge as they extend rearwardly. The side members 75 are connected by a forward transverse frame member 76 to which the tongue 74 is attached and by a rearward transverse frame member 77, thus forming a rigid draw structure.

Pivotally mounted on a lug or ear 82 projecting upwardly from the rearward transverse frame member 77 is a hydraulic cylinder 81, the other end of which is pivotally connected to an upstanding lever 83. The lever 83 is in turn pivotally mounted on the forward transverse frame member 76 and has an upper end pivotally connected at a point above its pivotal connection with the hydraulic cylinder 81 to the ends of rearwardly diverging generally horizontal rods 84. The rods 84 are pivotally connected to brackets 85 which are attached to center section connecting members 91. The connecting members 91 rigidly connect the forward, middle, and rearward tool bars 1a comprising the center section 2a. The brackets 85 are also pivotally connected to side members 75. The agricultural implement 71 may thereby be raised at the rear end thereof by rotating about the pivotal connection of the brackets 85 and side members 75 from an operating configuration as shown in FIG. 5 with the tool bars 1a aligned substantially horizontally with respect to each other to a configuration wherein the tool bars 1a are stacked substantially vertically with request to each other, whereby the implement 71 may be folded to a transporting configuration as illustrated in FIG. 6.

The center section 2a of the folding agricultural implement 71 is comprised of elongated front, middle and rear center tubes 14a which are substantially parallel to each other in operating configuration as shown in FIG. 5. The center tubes 14a have cross-sectional shapes which are substantially square and have right ends 15a and left ends 16a.

The right and left wing sections 3a and 4a are comprised of forward, middle and rearward tubes 17a and 19a respectively, which are generally aligned with the center section tubes 14a in the operating configuration as illustrated in FIG. 5. The wing section tubes 17a and 19a also have cross-sectional shapes which are substantially annularly square-shaped and have respective proximate ends 18a and 20a. Elongated passageways 18'a which are substantially square in cross-sectional shape are defined by the interior of the proximate ends 18a and 20a. Elongated telescoping members 21a include slide portions 21'a with substantially square cross-sectional shapes and are positioned within the elongated passageways 18'a in the proximate ends 18a and 20a and snugly but slidably mate therewith. The telescoping members 21a also include clevis or trunnion-like ends 22a with side plates 23a spaced from the slide portions 21'a and extending outwardly from the elongated passageways. The right and left ends 15a and 16a of the center tubes 14a are adapted for fitting between the side plates 23a and pivoting with respect to the telescoping members 21a about pin members 26a positioned in aligned apertures 24a and 25a in the side plates 23a and the center tubes 14a respectively. The axes of the pin members 26a are horizontally aligned when the implement 71 is in the transporting configuration thereof.

Rigid link members 32a are pivotally attached to the center tubes 14a by link hinge connectors 35a on the right and left ends 15a and 16a respectively and to the right and left tubes 17a and 19a by lost motion link hinge connectors 43a on the proximate ends 18a and 20a thereof. The rigid link members 32a limit the distance in spaced relationship between the pivotal connections thereof on the right and left ends 15a and 16a of the center tube 14a and the proximate ends 18a and 20a of the tubes 17a and 19a respectively. The telescoping members 21a are thereby automatically biased to simultaneously slide with respect to the right and left tubes 17a and 19a and to pivot with respect to the center tube 14a when the right and left wing sections 3a and 4a are folded with respect to the center section 2a to a transporting configuration as illustrated in FIG. 6.

The center section tubes 14a are connected by the center section connecting members 91 near the respective right and left ends 15a and 16a of the center tube 14a. The connecting members 91 extend forwardly from the center section 2a and have center section wheels 95 rotatably mounted thereon. As shown in FIG. 5, the center section connecting members 91 are staggered with respect to the center section tubes 14a to avoid conflict with the ground working tools 7a thereon. The center section tubes 14a and the center section connecting members 91 thereby form a substantially rigid frame for supporting the ground-working tools 7a thereon. The tubes 17a and 19a of the right and left wing sections 3a and 4a are connected at outer ends 87 and 89 thereof respectively by wing connecting members 93 which extend forwardly of the wing sections and have wing operating wheels 96 mounted thereon. Wing section transporting wheels 97 are also rotatably mounted forward of the wing sections 3a and 4a and have rotational axes perpendicular to the rotational axes of wing section operating wheels 96.

As with the first embodiment of the present invention, it is considered advantageous for the ground-working tools 7a to be substantially evenly spaced along the tool bars 1a and to be substantially similar in length, thickness and configuration for the same reasons as set forth above in describing the first embodiment. Preferably ground-working tools 7a are slightly laterally spaced between frontward and rearward tool bars 1a.

Each of the ground-working tools 7a has a distal end 53a, a convoluted connector section 54a depending from a tool bar engaging end 55a, and an arcuate working section 56a extending from the convoluted connector section 54a to the distal end 53a. The arcuate working sections 56a of the ground-working tools 7a project rearwardly from the tubes when the implement 71 is extended to its operating configuration as shown, thereby allowing the ground-working tools 7a to flex rearwardly in response to varying amounts of torqueing force to which they are subjected during operation on a field surface.

The ground-working tools 7a are attached to the agricultural tool bars 1a by securing tool bar engaging ends 55a by suitable conventional brackets 57a having a fastener 58a to the tool bars 1a. The convoluted connector sections 54a are thereby maintained out of contact from the tubes 14a, 17a and 19a, hence leaving the tools 7a unhindered to flex as desired.

Ground-working tools 7a attached to the center tubes 14a at or near the respective right and left ends 15a and 16a thereof are generally designated by the reference numeral 51a. The right and left tubes 17a and 19a have ground-working tools generally designated by the reference numeral 52a attached at or near the proximate ends 18a and 20a thereof. The spacing of the tools 51a and 52a on either side of the right and left telescoping hinges 5a and 6a respectively is substantially the same as the spacing of the remainder of the ground-working tools 7a along the tool bars 1a. When the implement 71 is folded from an operating configuration as shown in FIG. 5 to a transporting configuration as shown in FIG. 6, the rear of the implement 71 is first raised until the tool bars 1a are vertically aligned after which the telescoping members 21a slide outwardly from the elongated passageways in the proximate ends 18a and 20a of the right and left tubes 17a and 19a and thereby cause the ground-working tools 52a to overlap or mesh without engaging the ground-working tools 51a such that no entanglement or damage occurs thereto.

As with the first embodiment of the present invention, the spacing between the tool 7a, the distance rearwardly which the arcuate working sections 56a thereof project and the cross-sectional width of the tools 7a are all factors in determining the amount of clearance needed between the tools 51a and 52a to avoid entanglement therebetween. When the implement 71 is folded to its transporting configuration, the distance which the telescoping member 21a slides from its fully inserted to its fully extended positions within the elongated passageways in the proximate ends 18a and 20a will vary with the placement of the pivotal connectors 35a and 43a of the rigid link members 32a on the wing tubes 17a or 19a and the center tube 14a along with the length of the rigid link member 32a. For example, by increasing the distance between the pivotal connections 35a and 43a respectively and by increasing the length of the rigid link members 32a, the distance which the telescoping members 21a slide when the tool bars 1a are folded is thereby increased, hence allowing greater clearance for the ground-working tools 51a with respect to the ground-working tools 52a.

In operation, the agricultural implement 71 is transported with the wing sections 3a and 4a folded with respect to the center section 2a as shown in FIG. 6. The implement 71 rolls on the center section wheels 95 and the wing section transporting wheels 97. The tubes of center section 2a and the wing sections 3a and 4a are aligned generally parallel and vertical with respect to each other and the ground working tools thereon project rearwardly from the center section 2a and inwardly from the wing sections 3a and 4a. The telescoping members 21a are at a maximum extension thereof relative to the elongated passageways defined by the interior of the proximate ends 18a and 20a of the right and left tubes 17a and 19a, and the ground working tools 52a adjacent the proximate ends 18a and 20a thereby overlap without engaging and are in spaced relationship rearward of the ground working tools 51a to avoid entanglement and damage therebetween as described above. The telescoping members 21a are prevented from sliding completely out of the proximate ends 18a and 20a by the rigid link members 32a. The right and left wing sections 3a and 4a have connecting means therebetween, such as a cable 97 to prevent unfolding thereof while the implement is being transported.

When the desired location is reached, the implement 71 may be unfoled by removing the connecting cable 98 and driving the tractor in a rearward direction thereby urging the wing sections 3a and 4a to unfold to a substantially aligned position with respect to the center section 2a. The hydraulic cylinder 81 is then retracted by hydraulic control means (not shown) thereby moving the upstanding lever 83 and the diverging horizontal rods 84 pivotally connected thereto in a rearward direction, which in turn pivot the brackets 85 about their pivotal connections with the yoke assembly 72 and the implement 71 is thus lowered at a rearward end thereof to a position wherein the tool bars 1a all lie in a generally horizontal plane and the distal ends 51a of the ground working tools 7a are thereby allowed to contact a ground surface.

Because the telescoping hinges 5a and 6a allow the wing sections 3a and 4a to fold a limited amount with respect to the center section 2a along a generally transverse horizontal axis thereof when the implement 71 is in an operating configuration, the sections are thereby allowed to independently respond to variances in ground elevation and maintain the ground-working tools 7a in consistent contact therewith. Also, because the telescoping hinges 5a and 6a are substantially aligned horizontally in an operating configuration, they resist bending moment to the wing sections 3a and 4a as the implement 71 is pulled over a field surface and thereby maintain the tool bars 1a in a substantially aligned configuration along a transverse horizontal axis thereof. As with the first embodiment of the present invention, the lost motion pivotal connections 43a between the rigid link members 32a and the proximate ends 18a and 20a allow a certain amount of pivotal movement between the center section 2a and the wing sections 3a and 4a without the telescoping members 21a being biased to slide within the elongated passageways of the left and right tubes 17a and 19a. When the implement 71 is in an operational configuration the rigid link members 32a maintain the spacing between the ground-working tools 7a by preventing the telescoping members 21a from sliding substantially with respect to the respective right and left tubes 17a and 19a.

When it is desired to fold the implement 71a from an operational configuration as illustrated in FIG. 5 to a transporting configuration as illustrated in FIG. 6, the hydraulic cylinder 81 is first extended to pivot the implement 71 to a position where the tool bars 1a are substantially vertically stacked. The center section wheels 95 and the wing section transporting wheels 97 are then in contact with the ground surface, and the wing section operating wheels 96 are in spaced relation thereabove. A tractor connected to the implement 71 may then be driven forward to fold the wing sections 3a and 4a rearwardly with respect to the center section 2a. The rigid link member 32a causes the telescoping member 21a to slide outwardly of the elongated passageways in the tubes 17a and 19a to the fullest extension thereof. The ground-working tools 52a adjacent or near the proximate ends 18a and 20a overlap and are in spaced relationship rearward of the ground-working tools 51a adjacent or near the right and left ends 15a and 16a of the center tubes 14a, as illustrated in FIG. 6. Entanglement and damage to the respective tools 51a and 52a is thereby avoided. The wing sections 3a and 4a may then be interconnected by the connecting cable 98 and the implement 71 is ready for transporting or storage.

It is to be understood that while certain forms of the present invention have been illustrated and described herein, it is not to be limited to the specific forms or arrangement of parts herein described and shown.

What is claimed and desired to secure by Letters Patent is as follows:

1. A mechanism for horizontally pivotally connecting sections of a foldable agricultural tool bar, said mechanism comprising:
   (a) a first elongated section having a proximate end and a longitudinal axis, said first section having at least one ground-working tool mounted thereon;
   (b) a second elongated section having a proximate end associated with the proximate end of said first elongated section and a longitudinal axis, said second section having at least one ground-working tool mounted thereon;
   (c) a telescoping member having a slide portion and an end portion, said slide portion being slidably engaged with the proximate end of said first section so as to telescope with respect to said first section, said end portion being spaced from said slide portion;

(d) hinge means for horizontally pivotally connecting the end of said telescoping member to the proximate end of said second section, said hinge means being in spaced relationship to the proximate end of said first section, whereby said telescoping member is allowed to simultaneously telescope with respect to said first section and pivot horizontally with respect to said second section;

(e) said first section and said telescoping member being aligned such that said member telescopes substantially parallel to the longitudinal axis of said first section; and (f) linking means connected to said first and second sections and limiting the telescoping movement of the telescoping member with respect to said first section.

2. A mechanism as set forth in claim 1 which includes:
(a) locking means engageable with and adapted for preventing said first and second sections from folding with respect to each other and for allowing said sections to fold with respect to each other when said locking means is disengaged from said sections.

3. A mechanism as set forth in claim 1 wherein:
(a) said linking means comprises:
   (1) a rigid link member having opposite ends and being adapted for biasing said telescoping member to simultaneously slide along the longitudinal axis of said first section when said first and second sections are folded about said hinge means with respect to each other; and
   (2) link hinge means pivotally connecting said opposite ends of said rigid link member to said first and second sections respectively near the proximate ends of said sections.

4. A mechanism as set forth in claim 3 which includes:
(a) said link hinge means including a lost motion coupling adapted for allowing limited pivotal movement of the second section with respect to the first section without the telescoping member slidably moving with respect to said first section.

5. A mechanism as set forth in claim 4 wherein:
(a) said lost motion coupling comprises:
   (1) an ear with a first aperture therethrough projecting from one of said sections near the proximate end of said respective section;
   (2) an elongated second aperture in the respective opposite end of said rigid link member associated with said first aperture; and
   (3) a pin pivotally positioned through said first and second apertures, said pin being adapted for limited lateral movement within said elongated second aperture.

6. A mechanism as set forth in claim 1 wherein:
(a) said hinge means includes:
   (1) a first aperture in said telescoping member end aligned with a second aperture in said second section proximate end; and
   (2) a pin positioned through said first and second apertures; and
   (3) at least one of said first and second apertures being elongated and thereby adapted for allowing said pin to move within said elongated aperture.

7. A foldable agriculture implement comprising:

(a) A first elongated section having a longitudinal axis and being comprised of forward and rearward tool bars being generally parallel to said first section longitudinal axis, each of said tool bars having proximate ends and being adapted for receiving earth-working tools thereon;

(b) a second elongated section having a longitudinal axis comprised of forward and rearward tool bars being generally parallel to said second section longitudinal axis, said tool bars having proximate ends associated with respective proximate ends of said first section tool bars;

(c) each of said parallel tool bars of said first section including a telescoping member with a slide portion and an end portion, said slide portion being slidably engaged with the proximate end of said respective first section tool bar and being adapted to telescope with respect to said first section, tool bar, said end portions being spaced from said respective slide portions;

(d) hinge means for pivotally connecting the end portion of each of said telescoping members to the proximate ends of respective tool bars of said second section, said hinge means being in spaced relationship to the proximate ends of said tool bars of the first elongated section, whereby said telescoping members are allowed to simultaneously telescope with respect to said first section tool bars and pivot with respect to said second section tool bars;

(e) the tool bars comprising said first section and said telescoping members being aligned such that said members telescope substantially parallel to the longitudinal axis of said first section;

(f) linking means limiting the telescoping movement of the telescoping members with respect to the tool bars of said first section;

(g) said implement having an unfolded configuration wherein the axes of said first and second sections are generally aligned with respect to each other and said implement having a transporting configuration wherein said axes of said first and second sections are foldable to an angular relationship with respect to each other; and (h) rotational means adapted for rotating said sections about an axis generally parallel to said longitudinal axes of said first and second sections while in said unfolded configuration between a first position wherein the tool bars of said sections are in vertically spaced relationship to a second position wherein the tool bars of said sections are in horizontally spaced relationship; said sections being foldable to said transporting configuration when in said first position.

8. An implement as set forth in claim 7 which includes:
(a) a plurality of ground-working tools projecting downwardly and rearwardly from said tool bars at substantially uniform spacings along the lengths thereof when said sections are in said second position; and including
(b) one of said ground-working tools being positioned near the proximate ends of each of said tool bars.

9. An implement as set forth in claim 8 wherein:
(a) said telescoping members slide outwardly from said respective first section tool bars and pivot with respect to said respective second section tool bars whereby the ground-working tools positioned near the proximate ends of each of the first section tool bars overlap associated tools near the proximate ends of the second section tool bars without entanglement therebetween when said sections are folded to said transporting configuration.

10. An implement as set forth in claim 8 wherein:
(a) said hinge means has a generally horizontally aligned axis when said sections are in said second position whereby said sections may fold about said hinge means axis while in said second position to an angular configuration with respect to each other and thereby maintain said ground-working tools in contact with an irregular ground surface; and
(b) said hinge means locks said first and second sections against horizontal folding with respect to each other while in said second position.

11. An implement as set forth in claim 7 including:
(a) motive means connected to said first and second elongated sections and being adapted for drawing said sections and the ground-working tools on said tool bars over a field in a forward direction for working said field and for pushing said sections in a rearward direction;
(b) said motive means being adapted for folding said first and second sections from said first position to said transporting configuration when the sections are drawn forward; and
(c) said motive means being adapted for folding said first and second sections from said transporting configuration to said first position when the sections are pushed in said rearward direction.

12. An implement as set forth in claim 7 wherein:
(a) said linking means comprises:
(1) a plurality of rigid link members; each link member being associated with a respective first section tool bar and a second section tool bar; said rigid link members having opposite ends and being adapted for biasing said telescoping members simultaneously to slide with respect to said first section tool bars and to pivot with respect to said second section tool bars when said first and second sections are folded about said hinge means with respect to each other; and
(2) link hinge means pivotally connecting said opposite ends of said rigid link members to said first and second section tool bars respectively near the proximate ends of said respective sections.

13. An implement as set forth in claim 12 which includes:
(a) said link hinge means including a lost motion coupling adapted for allowing limited pivotal movement of said first and second sections with respect to each other without the telescoping members slidably moving with respect to said first section tool bars.

14. An implement as set forth in claim 13 wherein:
(a) said lost motion coupling comprises:
(1) an ear with a first aperture therethrough and projecting from an associated tool bar near the proximate end of said tool bar:
(2) an elongated second aperture in the respective opposite end of said rigid link member aligned with the first aperture on said ear; and
(3) a pin positioned through said first and second apertures; said pin being adapted for limited lateral movement within said elongated aperture.

15. An implement as set forth in claim 7 which includes:

(a) locking means operably connected to said first and second sections and adapted for preventing said first and second sections from folding with respect to each other while in said second position and adapted for allowing said sections to fold with respect to each other when said locking means is disengaged from said sections.

16. A mechanism comprising:
(a) a first elongated section havig a proximate end and a longitudinal axis;
(b) a second elongated section having a proximate end associated with the proximate end of said first elongated section and a longitudinal axis;
(c) said sections being substantially aligned longitudinally with respect to each other in an operational configuration and foldable with respect to each other to a transporting configuration;
(d) an elongated passageway along the longitudinal axis of said first section in the proximate end thereof;
(e) a telescoping member having a slide portion and an end portion, said slide portion being slidably positioned in said elongated passageway and being adapted for telescoping movement with respect to said first section, said end portion being spaced from said slide portion;
(f) hinge means pivotally connecting the end of said telescoping member to the proximate end of said second section, said hinge means being in spaced relationship to the proximate end of said first section, whereby said telescoping member is allowed to simultaneously telescope with respect to said first section and pivot with respect to said second section;
(g) said first section and said telescoping member being aligned such that said telescoping member has a telescoping movement substantially parallel to the longitudinal axis of said first section;
(h) a rigid link member having opposite ends and being adapted for biasing said telescoping member so as to simultaneously slide along the longitudinal axis of said first section when said first and second sections are folded about said hinge means with respect to each other;
(i) link hinge means pivotally connecting said opposite ends of said rigid link member to said first and second sections respectively near the proximate ends of said sections;
(j) said link member being adapted for retaining at least a portion of the telescoping member within the elongated passageway of said first section during said telescoping movement;
(k) a plurality of ground-working tools with substantially equal distances therebetween projecting transversely further from said sections than the distances between said tools, including one of said tools being positioned near the proximate end of each of said first and second sections respectively; and
(l) the telescoping movement of said telescoping member maintaining the proximate ends of said sections in spaced relationship such that the ground-working tool near the proximate end of the first section overlaps the tool near the proximate end of the second section without entanglement therebetween when said sections fold to said transporting configuration with respect to each other.

17. In combination with a horizontally foldable agricultural tool bar having a plurality of ground-working tools mounted thereon, a connecting mechanism which comprises:
  (a) a first section of said tool bar, said first section having an end;
  (b) a second section of said tool bar, said second section having an end adjacent said first section end;
  (c) a telescoping member slidably engaged with said first section for movement longitudinally thereof;
  (d) a pivotal connector fixed to said telescoping member and hingedly connected to said second section end whereby said first and second section are horizontally pivotal with respect to each other and simultaneously separable a variable distance upon the sliding of said telescoping member;
  (e) a link having opposite end portions; and
  (f) link hinge means pivotally connecting one of said link opposite end portions to a point on one of said first and second elongated section respectively; said link hinge means being pitovable in a direction complimentary to that of said telescoping member pivotal connector so as to permit pivoting horizontally between said telescoping member and said second section in at least one direction simultaneously with the pivoting of said link hinge means, said link thereby limiting the distance in spaced relationship between respective points on said first and second sections.

18. A mechanism for pivotally connecting sections of a foldable agricultural tool bar, said mechanism comprising:
  (a) a first elongated section having a proximate end and a longitudinal axis;
  (b) a second elongated section having a proximate end associated with the proximate end of said first elongated section in the longitudinal axis;
  (c) a telescoping member having a slide portion and an end portion, said slide portion being slidably engaged with the proximate end of said first section so as to telescope with respect to said first section, said end portion being spaced from said slide portion;
  (d) hinge means for pivotally connecting the end of said telescoping member to the proximate end of said second section, said hinge means being in spaced relationship to the proximate end of said first section, whereby said telescoping member is allowed to simultaneously telescope with respect to said first section and pivot with respect to said second section;
  (e) said first section and said telescoping member being aligned such that said member telescopes substantially parallel to the longitudinal axis of said first section;
  (f) linking means connected to said first and second sections and limiting the telescoping movement of the telescoping member with respect to said first section;
  (g) said first and second sections being substantially longitudinally aligned in an operating configuration and foldable with respect to each other to a transporting configuration; and
  (h) a plurality of ground-working tools projecting downwardly and rearwardly from each of said first and second sections when aligned in said operating configuration in substantially uniform spacings along the longitudinal axes thereof; including at least one of said ground-working tools positioned near the proximate end of each of said sections.

19. A mechanism as set forth in claim 18 wherein:
  (a) said telescoping member slides outwardly from said first section and pivots with respect to said second section whereby the ground-working tool near the proximate end of the first section overlaps the tool near the proximate end of the second section without entanglement therebetween when said sections are folded to said transporting configuration.

* * * * *